S. B. HENDRICKS.
PLOW.
APPLICATION FILED NOV. 1, 1915.

1,201,296.

Patented Oct. 17, 1916.
2 SHEETS—SHEET 1.

Inventor:
Simeon B. Hendricks

By Pond & Wilson
Attys.

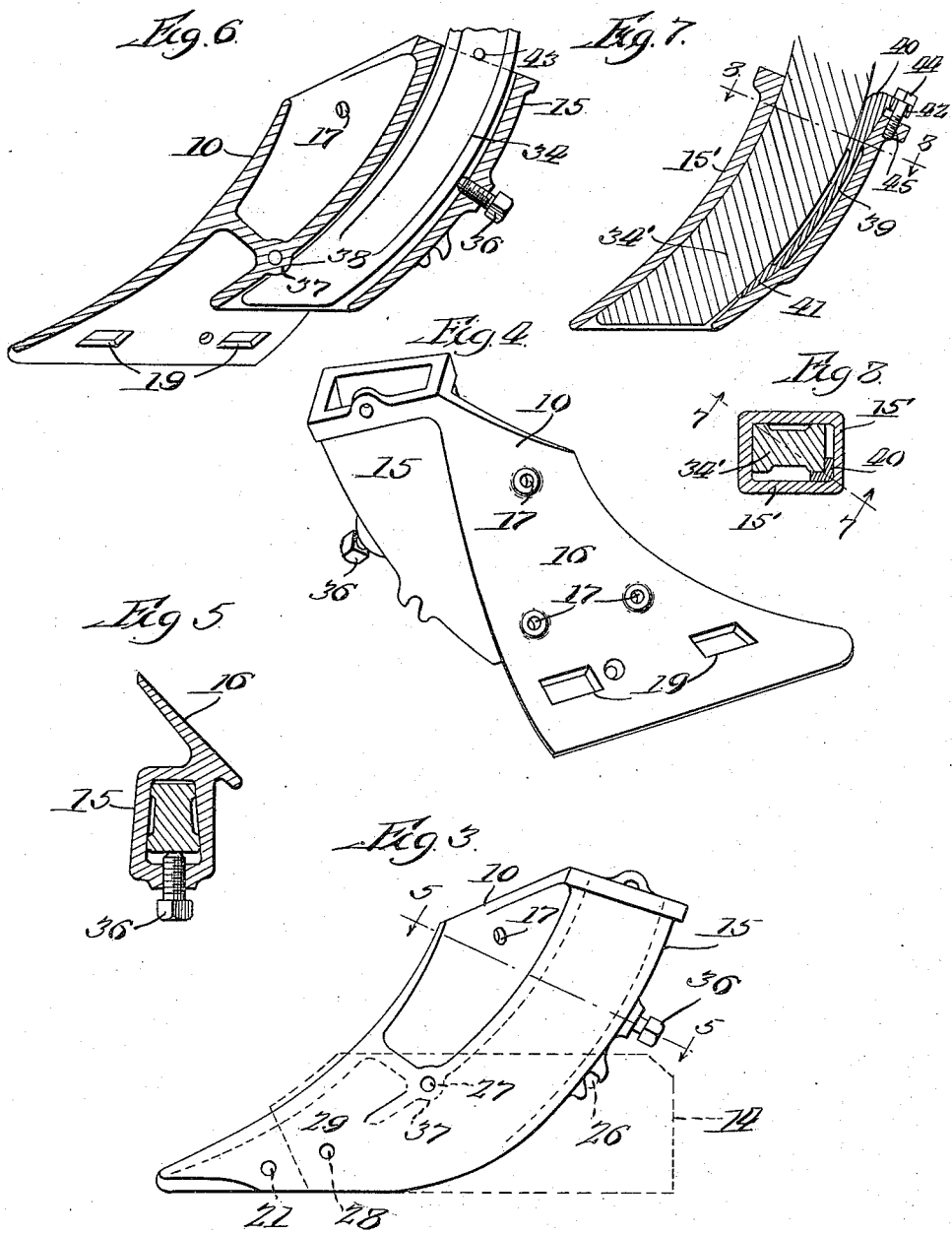

UNITED STATES PATENT OFFICE.

SIMEON B. HENDRICKS, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW.

1,201,296.  Specification of Letters Patent.  Patented Oct. 17, 1916.

Application filed November 1, 1915. Serial No. 59,095.

*To all whom it may concern:*

Be it known that I, SIMEON B. HENDRICKS, a citizen of the United States, residing at Rockford, in the county of Winnebago and State of Illinois, have invented certain new and useful Improvements in Plows, of which the following is a specification.

This invention relates to improvements in plows and has reference more particularly to an improved construction of plow bottoms designed to facilitate the attachment and detachment of a plow bottom to the plow beam or frame.

The main object of the invention is to provide a construction whereby the plow bottom as a whole can be readily and quickly attached to and detached from the plow beam or frame without requiring the removal of bolts or similar fastening devices.

Another object of the invention is to provide a construction that will facilitate ready interchangeability of plow bottoms and plow beams.

Still another object is to provide an improved construction of frog that shall form the sole attachment of the plow bottom to the beam and shall itself afford means for attachment thereto in proper relation of the share, moldboard, and landside.

Other objects and advantages secured by the invention will be apparent to those skilled in the art as the same becomes better understood by reference to the following description when taken in connection with the accompanying drawings, wherein I have illustrated one practical and workable embodiment of the invention, and in which—

Figure 1:
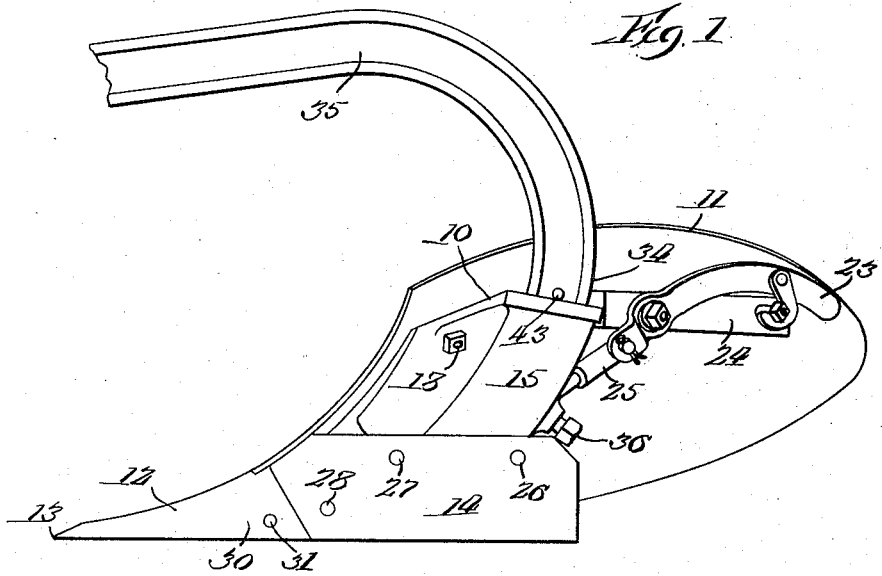
Figure 2:
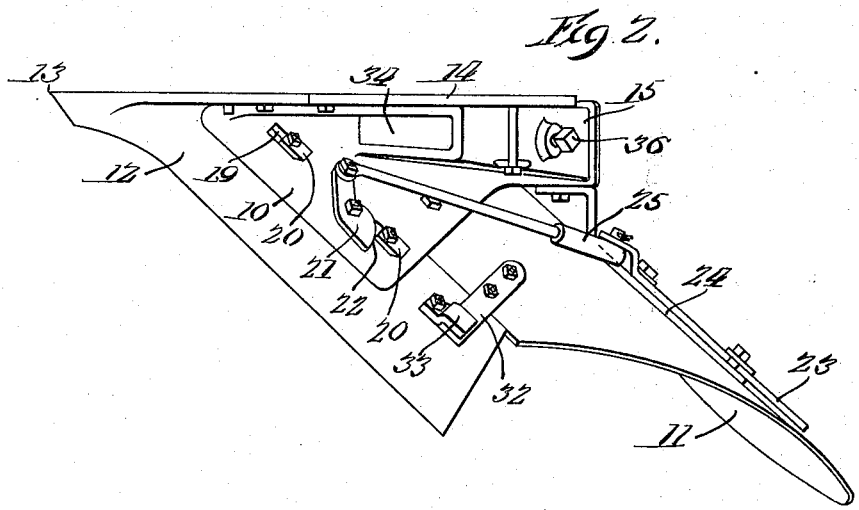

Figure 1 is a side elevation of the plow in working position as viewed from the land side thereof; Fig. 2 is a bottom plan view; Fig. 3 is a side elevation of the frog member; Fig. 4 is a perspective view of the frog member as seen from the side opposite that of Fig. 3; Fig. 5 is a cross section taken on the line 5—5 of Fig. 3; Fig. 6 is a side elevation, partly in vertical section, of the frog and inner or shank end of the plow beam illustrating one means for detachably connecting said parts; Fig. 7 is a vertical section taken on the line 7—7 of Fig. 8, illustrating a modified means for detachably connecting the frog and shank to the plow beam; and Fig. 8 is a cross section taken on the line 8—8 of Fig. 7.

The plow bottom herein illustrated is generally similar in its component parts and means connecting the same to that illustrated in Letters Patent to Erickson, No. 1,129,859, granted March 2, 1915, but differs therefrom in the form and structure of the frog, which, in the present case, includes as an integral part thereof, a socket member of substantial depth that is adapted to receive the depending inner end or shank of the plow beam and is provided with means for strongly securing the plow beam thereto with capacity for quick and ready detachability and without requiring the removal of bolts, and without requiring any special fitting of the parts.

The plow itself is of the general moldboard type, comprising as its principal elements a frog designated as an entirety by 10, a moldboard 11, a share 12 so shaped as to provide at its forward end the plow point 13, and a landside 14.

The frog itself, the structural features of which are most clearly shown in Figs. 3, 4, and 5, is an integral casting, preferably of soft gray iron, and comprises mainly a socket member 15 and an attachment plate 16 that extends in a generally oblique direction relatively to the longitudinal plane of the socket member 15 and lies opposite the outer forward edge of the latter as clearly shown in Fig. 5.

The face plate 16 is formed with three suitably spaced holes 17 for the attachment of the moldboard 11 thereto through the agency of bolts 18. The lower portion of the face plate 16 is likewise formed with locking slots 19 for the attachment of the share 12; this attachment being effected through the agency of cam shaped studs 20 that are secured on the inner face of the share, extend through the slots 19, and are drawn into snug locking engagement with the rear ends of the slots by a mechanism comprising a pivoted clamping lever 21 having a cam face 22 that is swung into engagement with the rear side of one of the studs 20 to force the share inwardly or rearwardly into secure engagement with the lower portion of the frog. This is accomplished by means of a hand lever 23, that is pivoted to a brace 24 that connects the rear portion of the moldboard 11 and the rear portion of the frog 10, and an adjustable connecting link 25; this last described device for detachably securing the share to the lower portion of the frog being substantially the same as that illustrated and described in the patent to Erickson above referred to, to which patent reference may be had for a more detailed description thereof.

The landside 14 is strongly secured to the inner or land side of the frog by means of a pair of bolts 26 and 27 passing therethrough and across the rear and front walls of the socket member 15, and a third bolt 28 uniting the forward end of the landside to a forward projection 29 of the inner side wall of the socket member 15 constituting a landside attachment plate. The vertical wall 30 of the share is likewise fastened to the attachment plate 29 of the frog by a bolt 31. The rear end of the share 12 is additionally locked in surface alinement with the lower edge of the mold board 11 by means of a cleat 32 bolted to the moldboard and engaged beneath a keeper or clamp 33 secured to the inner face of the share 12.

By reference to Figs. 3 to 6 inclusive, it will be noted that the socket member 15 of the frog has a substantial depth, being practically co-extensive with the full vertical height of the frog, and is curved substantially in conformity to the curve of the inner depending portion or shank 34 of the plow beam 35, so as to readily receive the latter and provide a bearing of substantial length for the frog on the beam.

By reference to Fig. 5, it will be noted that the socket member 15 is of polygonal shape in cross section conforming to the cross sectional shape of the beam shank 34 so as to prevent any turning tendency of the frog on the shank; and by preference the opposite side walls of the socket member are slightly inclined toward each other in the forward direction, thereby producing a tapering or wedge shaped receiving chamber or socket for the shank of the beam, which latter is correspondingly tapered from its rear to its front edge. The fore and aft transverse dimension of the chamber of the socket member is slightly greater than the corresponding dimension of the shank of the beam, as clearly shown in Figs. 5 and 6, so that the shank of the beam may be very easily slid into and out of the socket member, but may be wedged tightly into engagement with and keyed to the latter through the agency of a binding screw 36, that is tapped into the rear wall of the socket member and abuts against the rear side of the beam shank. As a means for indicating when the beam shank is fully engaged with the socket piece without involving any guess work on the part of the person uniting said parts, I may employ a lateral pin or lug 43 suitably located on the shank to contact with the upper end of the socket member when the shank has been fully entered into the latter. As an additional precaution against relative longitudinal displacement of the socket member and shank, I preferably provide a positive lock which may take the form of a transverse lug 37 formed on the inner side of the front wall of the socket member and a corresponding notch 38 formed across the front wall of the beam shank 34 and engaged with the said lug 37. When it is desired to remove the entire plow bottom from the plow beam, it is necessary only to back out the binding screw 36, whereupon the plow beam can readily be withdrawn from the socket member. By the simple converse of these operations the plow bottom is quickly and securely attached to the plow beam. The substantial length of coöperative engagement of the shank of the plow beam with the frog of the plow bottom insures the attachment of the bottom to the beam with ample rigidity and strength to resist all strains to which the plow is subjected in service and without any danger of the plow bottom working loose or coming off.

In Figs. 7 and 8, I have illustrated a modified form of securing the socket member to the shank of the beam, in which the socket member 15', rectangular in cross section instead of tapered and the shank 34' also rectangular cross-sectionally is held in engagement with two adjoining sides of the socket by means of a double wedge member, designated generally by 39. This member is shaped to provide integrally connected upper and lower wedges 40 and 41 respectively, which are rectangular cross-sectionally and are arranged to fit between a corner of the shank and socket member so that upon being moved inwardly of the socket the wedge member will force the beam into wedging engagement with said socket member. The upper end of the wedge member is provided with an apertured head or flange 42 to receive a screw 44 that enters a tapped hole 45 in the upper end of the socket member. By tightening up the screw 44, the wedge member 39 will obviously be forced inwardly and will effect wedging engagement of the shank of the beam with the socket member. The stop 43 described in the first modification would preferably be employed in the second modification for determining when the shank 34' has fully entered the socket member 15'. It should be understood that the several forms of tightening means disclosed, viz., the screw 36 and wedge member 39, are for purposes of illustration merely, and that various forms of tightening means might be devised and employed substantially equivalently to those means.

In addition to the purely mechanical advantages which my invention possesses in facilitating the work of connecting and disconnecting plow bottoms and plow beams, I may mention other practical advantages. For instance, a dealer, instead of carrying a supply of permanently connected plow frames and bottoms, may carry supplies of separate frames and bottoms and assemble them as required to fill orders for plows having various styles and constructions of plow bottoms. Of course, it has heretofore been possible to interchange plow beams and bottoms, but to do this has usually required the services of a mechanic or blacksmith, since the new bottom had to be specially fitted to the beam. My improvements also permit farmers to easily remove plow bottoms when the plowing season is over and store the bottoms separate from the plow frames. The plow bottom, which should be kept from subjection to all weather conditions, will occupy but little space in a storeroom, while the plow frame will not be materally affected by standing out doors or under a partial shelter. Thus there can be little excuse for not keeping the plow bottom in a dry place during non-use, because of the space required for storing. Furthermore, because of the various types of plow bottoms on the market, it has heretofore been a matter of difficulty to provide them with fastening means that would be uniform and interchangeable. The socketed frog of my present invention may constitute a frame or support for the moldboards, shares, plow points, and landsides of a great variety of plow bottoms. Hence the diversity in form, style and structure existing among plow bottoms offers no difficulty to ready interchangeability of the plow beams and bottoms when the latter are equipped with my present improvement. It may also be mentioned that where beams and bottoms are shipped and stored separately, far less shipping and storing room is required than where they are shipped and stored in assembled form.

While I have shown and described the beam-engaging member of the frog as a socket piece, this member need not necessarily have the specific form of a true socket, but it should, at least, embrace the shank of a plow beam at a plurality of sufficiently separated points to enable an adequate holding or securing effect to be obtained. Without therefore, limiting myself to the specific forms of the invention herein shown and described,—

I claim—

1. In a plow, the combination of a plow bottom including a frog shaped for the attachment thereto of a land side, a share, and a moldboard and having an upwardly extending socket of tapered shape in cross section, of a plow beam having a correspondingly shaped downwardly extending shank, and means for maintaining a wedging fit of said shank in said socket.

2. In a plow, the combination of a plow bottom including a frog shaped for the attachment thereto of a land side, a share, and a moldboard and having an upwardly extending socket, of a plow beam having a downwardly extending shank shaped for engagement in said socket, and means carried by the socket and adapted to be engaged with said shank for rigidly securing said shank in said socket.

3. In a plow, the combination with a frog formed with a socket of wedge shape in cross section, of a plow beam having a correspondingly shaped shank slidably engaging said socket, and means for forcing said shank into wedging engagement with said socket.

4. In a plow, the combination with a frog formed with a socket of wedge shape in cross section, of a plow beam having a correspondingly shaped shank slidably engaged in said socket, means engaging the rear wall of said socket and the rear side of said shank to force said shank into wedging engagement with said socket and coöperating devices on the front wall of said socket and the front side of said shank for locking the latter from withdrawal from the socket when said wedging means is operative.

5. In a plow, the combination with a plow beam having a depending shank portion of wedge shape fore and aft in cross section, of an integral cast metal frog comprising an attachment plate for a moldboard and share, an attachment plate for a landside and a socket member between said attachment plates, said socket member being of wedge shape fore and aft in cross section and having a greater fore and aft cross sectional dimension than said shank portion and slidably receiving the latter, and means for forcing said shank portion into wedging engagement with said socket.

SIMEON B. HENDRICKS.

Copies of this patent may be obtained for five cents each, by addressing the "Commissioner of Patents, Washington, D. C."